SMALL RETROFOCUS TYPE SUPER WIDE-ANGLE OBJECTIVE LENS SYSTEM

[75] Inventor: Nobuo Yamashita, Tokyo, Japan

[73] Assignee: Olympus Optical Company Limited, Tokyo, Japan

[22] Filed: May 1, 1973

[21] Appl. No.: 356,192

[30] Foreign Application Priority Data
May 4, 1972 Japan.............................. 47-44326

[52] U.S. Cl................................ 350/214; 350/176
[51] Int. Cl............................ G02b 9/00; G02b 1/00
[58] Field of Search.......................... 350/214, 176

[56] References Cited
UNITED STATES PATENTS

| | | | |
|---|---|---|---|
| 3,549,241 | 12/1970 | Mori | 350/214 X |
| 3,572,901 | 3/1971 | Mori | 350/214 X |
| 3,740,120 | 6/1973 | Rühl | 350/214 |
| 3,748,021 | 7/1973 | Tajima et al. | 350/214 |

*Primary Examiner*—Paul A. Sacher
*Attorney, Agent, or Firm*—Haseltine, Lake & Waters

[57] ABSTRACT

A small retrofocus type super wide-angle objective lens system having an aperture ratio of 1:3.5 and a picture angle up to 100°, with a front divergent lens group A and a rear convergent lens group B, said front divergent lens group A consisting of front and rear lens groups $A_1$ and $A_2$, said front lens group $A_1$ consisting of a positive meniscus first component $L_1$ that has its object side a convex surface and two negative meniscus second and third components $L_2$ and $L_3$, said rear lens group $A_2$ consisting of a positive lens fourth component $L_4$ and a negative meniscus fifth component $L_5$, and said rear convergent lens group B consisting of two positive lens sixth and seventh components $L_6$ and $L_7$, a negative lens eighth component $L_8$, and two positive lens ninth and tenth components $L_9$ and $L_{10}$, and which is defined by the following three conditions, i.e.

1) $0.2 < \dfrac{f_{123}}{f_{45}} < 0.8$

2) $5f < r_2 < \infty$

3) $0.8f < \Sigma d_B < 2.5f$ wherein $f_{123}$ is a composite focal length of the first, second and third components $L_1$, $L_2$ and $L_3$, $f$ is an overall focal length of the total lens system, $r_2$ is a radius of curvature of the rear surface of the first component $L_1$, and $\Sigma d_B$ is the sum of the air spaces and axial thicknesses of the sixth component $L_6$ to the tenth component $L_{10}$ of the rear convergent lens group B.

5 Claims, 12 Drawing Figures

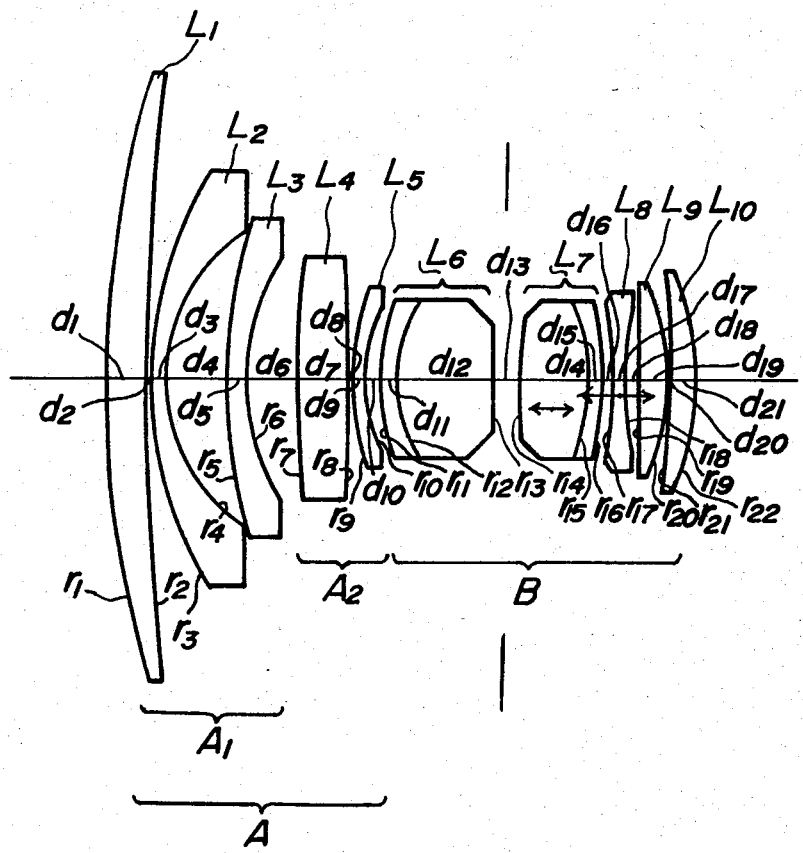

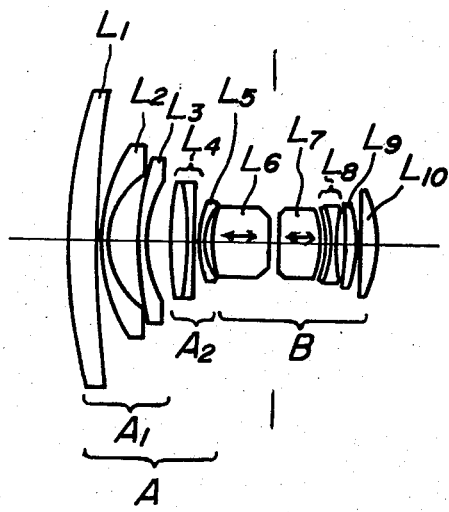
FIG_2

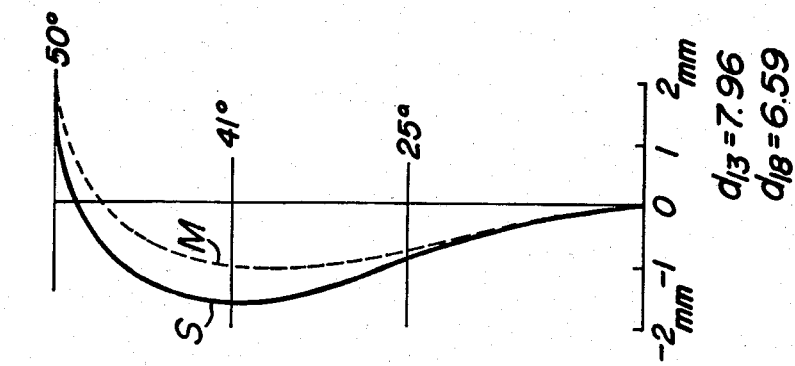
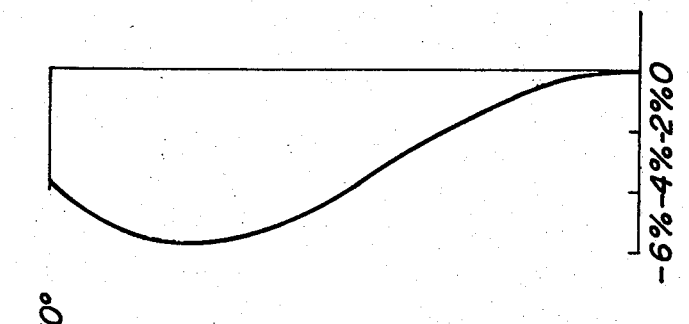
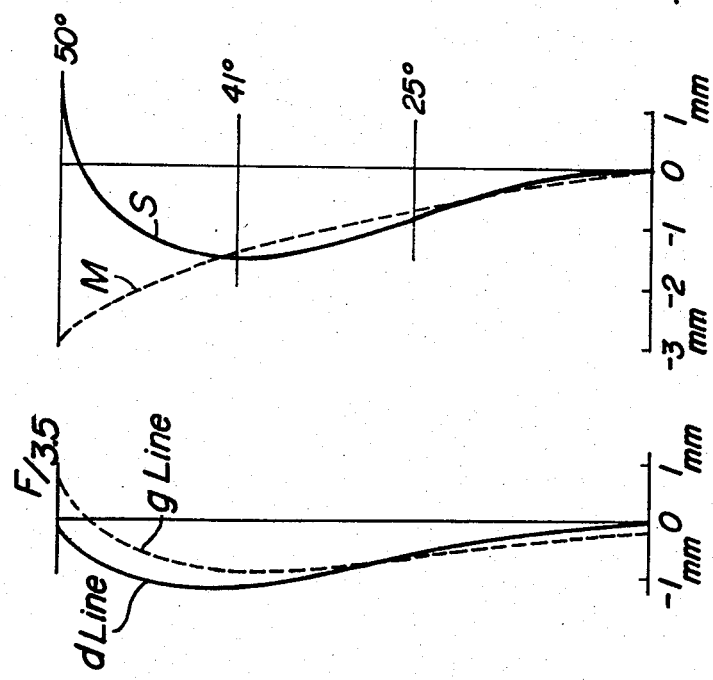

FIG_3d
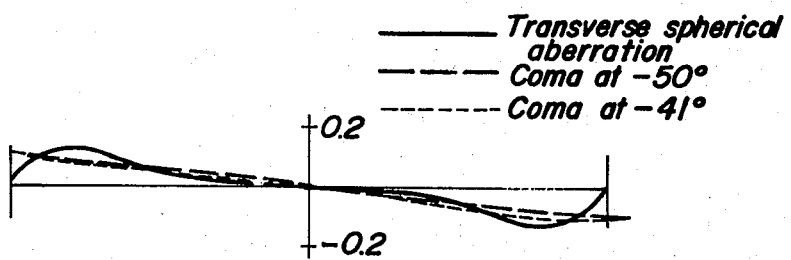
FIG_3f
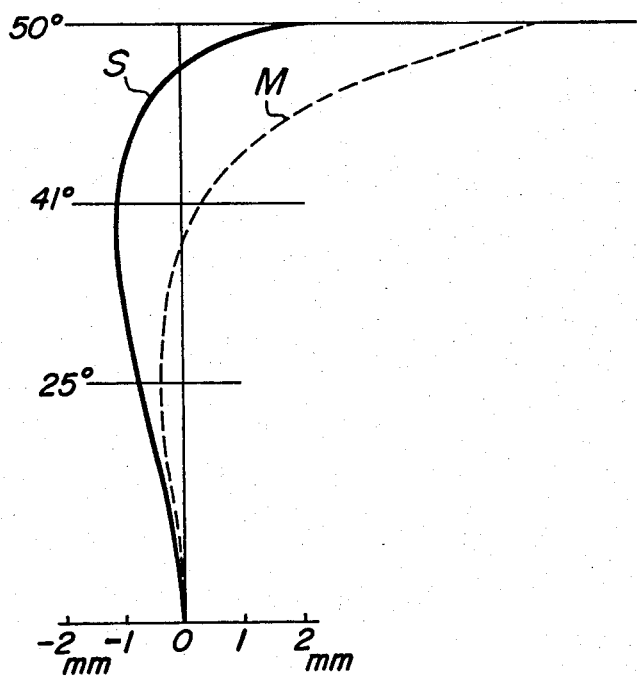

FIG_4a   FIG_4b   FIG_4c
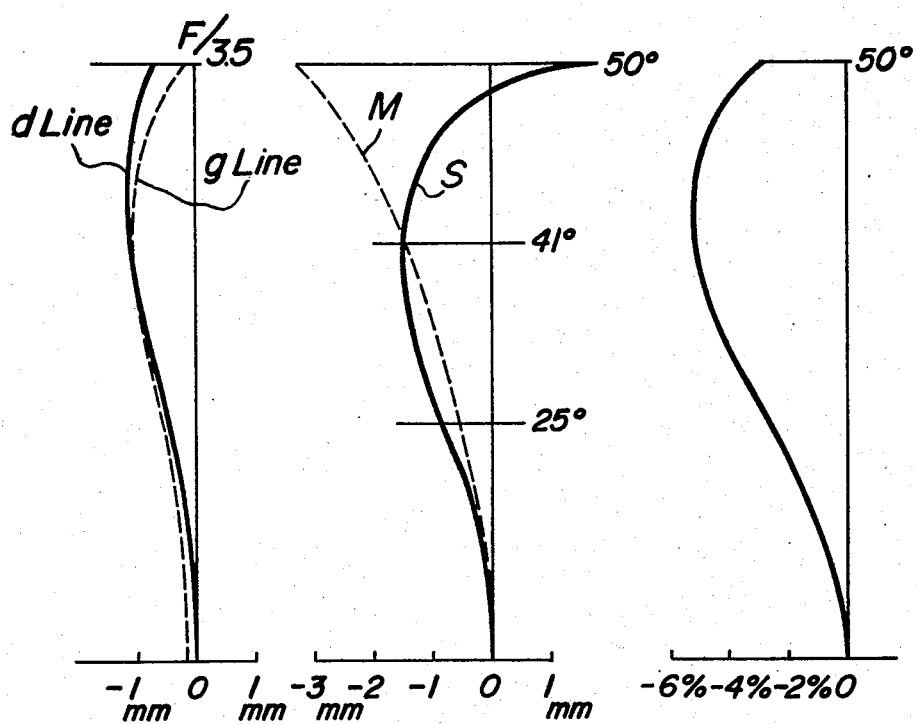
FIG_4d
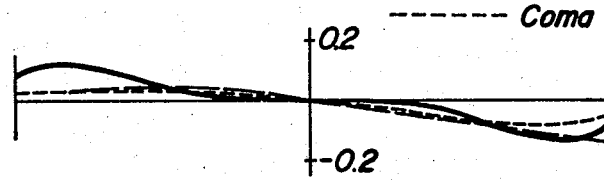
———— Transverse spherical aberration
— — — Coma at −50°
- - - - - Coma at −41°

SMALL RETROFOCUS TYPE SUPER WIDE-ANGLE OBJECTIVE LENS SYSTEM

This invention relates to a small retrofocus type super wide-angle objective lens system having an aperture ratio of 1:3.5 and a picture angle up to 100°.

A wide-angle lens for use in single-lens reflex cameras comprises a reflecting mirror disposed between the lens system and a film surface so that provision must be made of a back focal length which is longer than a given length. In a retrofocus type lens system, in general, if the lens system is made short in focal length, that is, wide in angle of view, the back focal length becomes short. In order to make the back focal length long, the front divergent lens group provided for the lens system must be separated long enough from the rear convergent lens group or each of these front and rear lens groups must have a sufficiently high refractive power. In the former design, the overall length of the lens system becomes long, and as a result, the lens system becomes large in size.

The small super wide-angle lens system according to the invention, therefore, makes use of the above mentioned latter design.

In the retrofocus type lens systems, in general, the high refractive power of the front and rear lens groups thereof is capable of making the back focal length long, but causes the negative distortion, astigmatisms and comas to be increased.

The object of the invention, by adopting suitable dimensions for successive components and suitable combination and arrangement thereof, is to provide a small retrofocus type super wide-angle objective lens system having an aperture ratio of 1:3.5, a picture angle up to 100° and a long back focal length and yet having significantly corrected various aberrations and thus is adapted for use in photographic cameras.

In the present invention, it has been found that the foregoing disadvantage can be obviated, with obtention of a small and significantly corrected super wide-angle objective lens system, by the provision of a novel lens type comprising a front divergent lens group consisting of five components and a rear convergent lens group consisting also of five components.

A feature of the invention is the provision of a small retrofocus type super wide-angle objective lens system with a front divergent lens group A and a rear convergent lens group B, said front divergent lens group A consisting of front and rear lens groups $A_1$ and $A_2$, said front lens group $A_1$ consisting of a positive meniscus first component $L_1$ that has its object side a convex surface and two negative meniscus second and third components $L_2$ and $L_3$, said rear lens group $A_2$ consisting of a positive lens fourth component $L_4$ and a negative meniscus fifth component $L_5$, and said rear convergent lens group B consisting of two positive lens sixth and seventh components $L_6$ and $L_7$, a negative lens eighth component $L_8$, and two positive lens ninth and tenth components $L_9$ and $L_{10}$, and which is defined by the following three conditions, i.e.

1) $0.2 < \dfrac{f_{123}}{f_{15}} < 0.8$
2) $5f < r_2 < \infty$
3) $0.8f < \Sigma d_B < 2.5f$ where $f_{123}$ is a composite focal length of the first, second and third components $L_1$, $L_2$ and $L_3$, $f$ is an overall focal length of the total lens system, $r_2$ is a radius of curvature of the rear surface of the first component $L_1$, and $\Sigma d_B$ is the sum of the air spaces and axial thicknesses of the sixth component $L_6$ to the tenth component $L_{10}$ of the rear convergent lens group B.

For a better understanding of the invention, the same will be explained by reference to the accompanying drawings, in which:

FIG. 1 shows in cross-section one embodiment of the small retrofocus type super wide-angle objective lens according to the invention;

FIG. 2 shows in cross-section another embodiment of the small retrofocus type super wide-angle objective lens according to the invention;

FIGS. 3a to 3f show aberration characteristic curves of the embodiment shown in FIG. 1; and FIGS. 4a to 4d show aberration characteristic curves of the embodiment shown in FIG. 2.

Referring to the drawings, the small retrofocus type super wide-angle objective lens according to the invention is shown in FIG. 1 in which A designates a front divergent lens group which consists of front and rear groups $A_1$ and $A_2$. B shows a rear convergent lens group. The front group $A_1$ consists of a positive meniscus first component $L_1$ that has its object side a convex surface $r_1$ and two negative meniscus second and third components $L_2$ and $L_3$. The rear group $A_2$ consists of a positive lens fourth component $L_4$ and a negative meniscus fifth component $L_5$. The rear convergent lens group B consists of two positive lens sixth and seventh components $L_6$ and $L_7$, a negative lens eighth component $L_8$ and two positive ninth and tenth components $L_9$ and $L_{10}$. If, the composite focal length of the front divergent lens group A is made about -0.7 times the overall focal length of the total lens system and the refractive power of each of the front and rear groups A and B is made high for the purpose of maintaining a long back focal length, the negative distortion and astigmatisms become large. In order to obviate such disadvantage, the front group $A_1$ of the front divergent lens group A consists of the first, second and third components $L_1$, $L_2$ and $L_3$, and the rear group $A_2$ consists of the fourth and fifth components $L_4$ and $L_5$ and the refractive power of each of these components is made small and provision is made of a positive lens as the front lens of the front group $A_1$ another positive lens as the front lens of the rear group $A_2$ of the front divergent lens group A, thereby correcting the above mentioned negative distortion and astigmatisms. In addition, the sum $\Sigma d_B$ of the air spaces and axial thicknesses of the sixth component $L_6$ to the tenth component $L_{10}$ of the rear convergent lens group B is given by $0.8f < \Sigma d_B < 2.5f$. This condition ensures an effective use of the divergent rays caused by the front lens group A and provides the important advantage that the back focal length can be made long and yet the comas, spherical aberrations and distortion can be significantly corrected, and that the diameter of the front lens can be made small.

The various conditions defined by the invention for optimum performance will hereinafter be described.

The condition (1) determines a ratio between the refractive power of the front group $A_1$ and the rear group $A_2$ of the front divergent lens group A. If the composite focal length $f_{123}$ of the front group $A_1$ distant from the diaphragm is made smaller than the composite focal length $f_{45}$ of the rear group $A_2$, the back focal length of the lens system can be made long, but the astigmatisms and negative distortion become increased. Conversely, if the composite focal length $f_{123}$ of the front group $A_1$ is made larger than the composite focal length $f_{45}$ of the rear group $A_2$, the back focal length of the lens system could not be made long and the diameter of the front lens becomes large. If $f_{123}/f_{45}$ is made larger than the upper limit 0.8, the back focal length becomes shorter than a given length. If $f_{123}/f_{45}$ is smaller than the lower limit 0.2, the negative distortion becomes considerably large.

The condition (2) is indispensable to correction of the astigmatisms and negative distortion caused by that value of $f_{123}/f_{45}$ approaches to the lower limit 0.2. If the radius of curvature $r_2$ of the rear surface of the first component $L_1$ exceeds the upper limit $\infty$ and hence the $r_2$ surface becomes concave toward the object side of the system, the negative distortion can easily be corrected, but the angles of incidence and projection of the main light rays with respect to the $r_2$ surface become large to produce higher degree of aberrations. If $r_2$ is made smaller than the lower limit $5f$, it becomes difficult to correct the astigmatisms and negative distortion.

The condition (3) makes use of a continuation of the divergence of light rays caused by the front divergent lens group A up to the rear convergent lens group B except a part thereof. The condition (3) is necessary to maintain the back focal length long. If $\Sigma d_B$ is smaller than the lower limit $0.8f$, it becomes impossible to keep the desired value of back focal length. Under such condition, if it is desired to make the back focal length long, the refractive power of the front divergent lens group A should be stronger or the refractive power of the rear convergent lens group B should be proportioned such that the refractive power of the rear side lens thereof is stronger than that of the front side lens. In either of these cases, there are produced the negative distortion and spherical aberrations and hence is not desirous. If $\Sigma d_B$ exceeds the upper limit $2.5f$, the diameter of the front lens and overall length of the system become large and hence cause inconvenience for users.

It is preferable to arrange the positive lens sixth and seventh components $L_6$ and $L_7$ face to face with a diaphragm therebetween and to define the ratio of the refractive powers of these two components by $0.3 < f_7/f_6 < 1$ in order to make the back focal length long and prevent the coma from being produced.

In accordance with the present invention, the front lenses of groups $A_1$ and $A_2$ of the front divergent lens group A comprise positive lenses, respectively, and as a result, the meridional image surface becomes considerably shifted to the positive direction when the system is focussed to the short distance. Thus, for short distance photographic purposes, it is preferable to move the seventh and eighth components $L_7$ and $L_8$ in unison to change $d_{13}$ and $d_{18}$ with $d_{13} + d_{18}$ constant, thereby correcting the inclination of the meridional image surface.

In FIG. 2 is shown another embodiment of the invention. In the present embodiment, the positive lens fourth component $L_4$ represented in FIG. 1 by a positive singlet lens is a positive doublet lens, the positive lens sixth and seventh components $L_6$ and $L_7$ represented in FIG. 1 by positive doublet lenses are positive singlet lenses, respectively, and the negative lens eighth component $L_8$ represented in FIG. 1 by the negative singlet lens is a negative doublet lens.

The invention will now be described with reference to the following examples.

EXAMPLE 1

In FIG. 1 is shown the construction of the lens system of the present embodiment whose numerical values, based upon a numerical value of 100 mm for the overall focal length, are substantially as given in the following table 1:

Table 1

$f=100, 2\omega=100°$

| Lens | Radii $r_1$ to $r_{22}$ | Thicknesses and air spaces $d_1$ to $d_{21}$ | $n_1$ to $n_{12}$ | $\nu_1$ to $\nu_{12}$ |
|---|---|---|---|---|
| $L_1$ | 447.86 | 18.66 | 1.726 | 53.6 |
|  | 1,149.04 | 1.10 |  |  |
| $L_2$ | 172.34 | 8.78 | 1.67 | 57.3 |
|  | 77.71 | 26.90 |  |  |
| $L_3$ | 232.27 | 8.67 | 1.67 | 57.3 |
|  | 96 | 23.27 |  |  |
| $L_4$ | 644.09 | 23.33 | 1.804 | 46.7 |
|  | $\infty$ | 1.10 |  |  |
| $L_5$ | 101.28 | 5.49 | 1.6968 | 55.6 |
|  | 53.59 | 9.94 |  |  |
| $L_6$ | 124.89 | 5.49 | 1.6968 | 55.6 |
|  | 54.89 | 45.40 | 1.5927 | 35.5 |
|  | −3,053.09 | 13.17 |  |  |
| $L_7$ | 461.49 | 32.94 | 1.64 | 60.3 |
|  | −70.54 | 5.49 | 1.51454 | 54.7 |
|  | −114.95 | 4.39 |  |  |
| $L_8$ | −250.43 | 5.49 | 1.80518 | 25.4 |
|  | 194.39 | 5.49 |  |  |
| $L_9$ | −1,754.41 | 13.72 | 1.618 | 63.4 |
|  | −100.06 | 0.82 |  |  |
| $L_{10}$ | −367.23 | 12.35 | 1.618 | 63.4 |
|  | −133.99 |  |  |  |

$$\frac{f_{123}}{f_{45}} = 0.573$$

The Seidel aberration coefficients of the lens system of the present embodiment are given in the following table 2:

Table 2

| Lens | Spherical aberrations | Comas | Astigmatisms | Distortion | Petzval sum |
|---|---|---|---|---|---|
| $L_1$ | 0.0026 | 0.0329 | 0.0093 | 0.4462 | 0.0928 |
|  | 0.0000 | 0.0470 | −0.0007 | −0.7783 | −0.0362 |
| $L_2$ | 0.0152 | 0.0270 | 0.0202 | 0.3433 | 0.2300 |
|  | −1.1763 | −0.0204 | 0.1550 | 0.0699 | −0.5101 |
| $L_3$ | 0.2093 | 0.0976 | 0.1429 | 0.1832 | 0.1707 |
|  | −2.6826 | −0.0025 | −0.0821 | −0.0127 | −0.4130 |
| $L_4$ | 0.6437 | 0.1946 | 0.3539 | 0.1446 | 0.0684 |
|  | −0.2086 | −0.2187 | −0.2136 | −0.2239 | 0.0000 |
| $L_5$ | 3.3690 | 0.1150 | 0.6223 | 0.0952 | 0.4004 |
|  | −28.4125 | −0.0005 | −0.1197 | −0.0032 | −0.7572 |
| $L_6$ | 11.1586 | 0.1827 | 1.4276 | 0.0649 | 0.3249 |
|  | −5.1830 | −0.0002 | −0.0310 | −0.0004 | −0.0693 |
|  | −0.5280 | −0.2781 | −0.3832 | −0.1931 | 0.0120 |
| $L_7$ | 1.7362 | 0.3846 | 0.8171 | 0.2203 | 0.0836 |
|  | 3.3116 | 0.0071 | −0.1529 | −0.0036 | 0.0708 |
|  | 7.6039 | 0.1209 | −0.9588 | −0.0521 | 0.2920 |
| $L_8$ | −2.2911 | −0.1634 | 0.6119 | 0.0906 | −0.1760 |
|  | −4.7648 | −0.7897 | −1.9398 | −0.4138 | −0.2267 |
| $L_9$ | 0.4129 | 0.3192 | 0.3630 | 0.2617 | −0.0215 |
|  | 8.7127 | 0.225 | −0.4423 | −0.0203 | 0.3772 |
| $L_{10}$ | −0.6916 | −0.0909 | 0.2507 | 0.0702 | −0.1028 |
|  | 12.293 | 0.0078 | −0.3101 | −0.1073 | 0.2817 |
| Sum | 3.5302 | −0.0056 | 0.1400 | 0.2815 | 0.0916 |

Various aberration characteristic curves of the present embodiment are shown in FIGS. 3a to 3f. FIG. 3a shows the spherical aberrations, FIG. 3b the astigmatisms, FIG. 3c the distortion, and FIG. 3d the comas.

In the present embodiment, for short distance photographic purposes, the seventh and eighth components $L_7$ and $L_8$ are moved in unison to change $d_{13}$ and $d_{18}$ with $d_{13}+d_{18}$ kept constant such that $d_{13}=7.96$ and $d_{18}=6.59$ in order to correct the inclination of the meridional image surface. In FIG. 3e are shown the astigmatisms at one-fortieth times when the seventh and eighth components $L_7$ and $L_8$ are moved in unison as described above. In FIG. 3f are shown those when the seventh and eighth components $L_7$ and $L_8$ are not moved in unison.

As seen from these aberration characteristic curves shown in FIGS. 3a to 3f, the present embodiment is capable of significantly correcting the various aberrations throughout F/3.5 and picture angle 100°.

EXAMPLE 2

In FIG. 2 is shown the construction of another embodiment of the invention whose numerical value of 100 mm for the overall focal length, are substantially as given in the following table 3:

Table 3

| Lens | Radii $r_1$ to $r_{22}$ | Thicknesses and air spaces $d_1$ to $d_{21}$ | $f=100$, $2\omega=100°$ $n_1$ to $n_{12}$ | $\nu_1$ to $\nu_{12}$ |
|---|---|---|---|---|
| $L_1$ | 495.86 | 26.90 | 1.8061 | 40.8 |
|  | 1,096.11 | 1.09 |  |  |
| $L_2$ | 156.51 | 8.73 | 1.67 | 57.33 |
|  | 74.22 | 26.74 |  |  |

Table 3 — Continued

| Lens | Radii $r_1$ to $r_{22}$ | Thicknesses and air spaces $d_1$ to $d_{21}$ | $f=100$, $2\omega=100°$ $n_1$ to $n_{12}$ | $\nu_1$ to $\nu_{12}$ |
|---|---|---|---|---|
| $L_3$ | 258.96 | 8.62 | 1.67 | 57.33 |
|  | 101.01 | 23.14 |  |  |
| $L_4$ | 426.22 | 12.28 | 1.7552 | 27.51 |
|  | −574.85 | 10.91 | 1.834 | 37.19 |
|  | −8,345.24 | 1.09 |  |  |
| $L_5$ | 103.21 | 5.46 | 1.6968 | 55.62 |
|  | 54.38 | 9.88 |  |  |
| $L_6$ | 160.76 | 50.59 | 1.56732 | 42.83 |
|  | −585.01 | 13.10 |  |  |
| $L_7$ | 648.73 | 34.60 | 1.6398 | 34.58 |
|  | −99.14 | 4.42 |  |  |
| $L_8$ | −137.99 | 5.46 | 1.804 | 46.65 |
|  | −109.12 | 3.55 | 1.8052 | 25.43 |
|  | 252.34 | 5.73 |  |  |
| $L_9$ | −417.21 | 13.10 | 1.618 | 63.38 |
|  | −94.77 | 6.82 |  |  |
| $L_{10}$ | −968.20 | 16.10 | 1.618 | 63.38 |
|  | −119.64 |  |  |  |

$$\frac{f_{123}}{f_{15}} = 0.497$$

The Seidel aberration coefficients of the lens system of the present embodiment are given in the following table 4:

Table 4

| Lens | Spherical aberrations | Comas | Astigmatisms | Distortion | Petzval sum |
|---|---|---|---|---|---|
| $L_1$ | 0.0019 | 0.0308 | 0.0077 | 0.4768 | 0.0884 |
|  | 0.0000 | 0.0414 | −0.0001 | −0.8031 | −0.0400 |
| $L_2$ | 0.0239 | 0.0280 | 0.0259 | 0.3031 | 0.2518 |
|  | −1.2585 | −0.0330 | 0.2037 | 0.0913 | −0.5310 |

Table 4—Continued

| Lens | Spherical aberrations | Comas | Astigmatisms | Distortion | Petzval sum |
|---|---|---|---|---|---|
| $L_3$ | 0.1775 | 0.1017 | 0.1343 | 0.1922 | 0.1522 |
|  | −2.4047 | −0.0040 | −0.0980 | −0.0161 | −0.3901 |
| $L_4$ | 0.7696 | 0.1709 | 0.3627 | 0.1273 | 0.0992 |
|  | 0.0003 | 0.0069 | 0.0015 | 0.0123 | −0.0042 |
|  | −0.1414 | −0.2080 | −0.1715 | −0.2457 | 0.0054 |
| $L_5$ | 2.7476 | 0.1148 | 0.5616 | 0.1033 | 0.3908 |
|  | −24.4392 | −0.0012 | −0.1714 | −0.0052 | −0.7418 |
| $L_6$ | 6.6442 | 0.1946 | 1.1369 | 0.0711 | 0.2212 |
|  | −0.0763 | −0.1879 | −0.1197 | −0.1995 | 0.0608 |
| $L_7$ | 0.7297 | 0.2949 | 0.4639 | 0.2250 | 0.0591 |
|  | 11.1612 | 0.1397 | −1.2485 | −0.0589 | 0.3866 |
| $L_8$ | −6.2450 | −0.1581 | 0.9936 | 0.0756 | −0.3173 |
|  | 0.0062 | −0.0000 | 0.0005 | 0.0000 | −0.0003 |
|  | −4.3181 | −0.8437 | −1.9087 | −0.4497 | −0.1736 |
| $L_9$ | 0.2145 | 0.3129 | 0.2591 | 0.2693 | −0.0899 |
|  | 5.2414 | 0.0241 | −0.3551 | −0.0284 | 0.3959 |
| $L_{10}$ | −0.0160 | −0.0396 | 0.0251 | 0.1233 | −0.0388 |
|  | 14.2580 | 0.0000 | −0.0076 | −0.0002 | 0.3136 |
| Sum | 3.0645 | −0.0149 | 0.0961 | 0.2639 | 0.0979 |

Various aberration characteristic curves of the present embodiment are shown in FIGS. 4a to 4d. FIG. 4a shows the spherical aberrations, FIG. 4b the astigmatisms, FIG. 4c the distortion, and FIG. 4d the comas.

As seen from these aberration characteristic curves shown in FIGS. 4a to 4d, the present embodiment is capable of significantly correcting the various aberrations throughout F/3.5 and picture angle 100°.

What is claimed is:

1. A small retrofocus type super wide-angle objective lens system with a front divergent lens group A and a rear convergent lens group B, said front divergent lens group A consisting of front and rear lens groups $A_1$ and $A_2$, said front lens group $A_1$ consisting of a positive meniscus first component $L_1$ that has its object side a convex surface and two negative meniscus second and third components $L_2$ and $L_3$ that have their object sides convex surfaces; respectively, said rear lens group $A_2$ consisting of a positive lens fourth component $L_4$ that has its object side a convex surface, and a negative meniscus fifth component $L_5$ that has its object side a convex surface, and said rear convergent lens group B consisting of a biconvex positive lens sixth component $L_6$ that has its object side a convex surface having a larger curvature, a positive biconvex seventh component $L_7$ that has its object side a convex surface having a smaller curvature, a negative lens eight component $L_8$, and two positive meniscus lens ninth and tenth components $L_9$ and $L_{10}$ that have their image sides convex surfaces, respectively, and which is defined by the following three conditions, i.e., 1) $0.45 < \dfrac{f_{123}}{f_{13}} < 0.6$ 2) $5f < r_2 < \infty$ 3) $1.4f < \Sigma d_B < 1.6f$ where $f_{123}$ is a composite focal length of the first, second and third components $L_1$, $L_2$ and $L_3$, $f$ is an overall focal length of the total lens systems $r_2$ is a radius of curvature of the rear surface of the first component $L_1$ and $\Sigma d_B$ is the sum of the air spaces and axial thicknesses of the sixth component $L_6$ to the tenth component $L_{10}$ of the rear convergent lens group B.

2. A small retrofocus type super wide-angle objective lens system as claimed in claim 1, wherein said sixth and seventh components $L_6$ and $L_7$ are arranged face to face with a diaphragm therebetween and the ratio of the refractive powers of said two components is defined by $$0.5 < \dfrac{f_7}{f_6} < 0.63.$$

3. A small retrofocus type super wide-angle objective lens system as claimed in claim 1, wherein the seventh and eight components $L_7$ and $L_8$ are positioned on the object side for focusing the lens system to the short distance with $d_{13}+d_{18}$ constant.

4. A small retrofocus type super wide-angle objective lens system as claimed in claim 1, wherein $f=100$ mm and $2\omega=100°$ and $r_1$ to $r_{22}$, $d_1$ to $d_{21}$, $n_1$ to $n_{12}$ and $v_1$ to $v_{12}$ are defined by the following values:

| Lens | Radii $r_1$ to $r_{22}$ | Thicknesses and air spaces $d_1$ to $d_{21}$ | $n_1$ to $n_{12}$ | $v_1$ to $\mu_{12}$ |
|---|---|---|---|---|
| $L_1$ | 447.86 | 18.66 | 1.726 | 53.6 |
|  | 1,149.04 | 1.10 |  |  |
| $L_2$ | 172.34 | 8.78 | 1.67 | 57.3 |
|  | 77.71 | 26.90 |  |  |
| $L_3$ | 232.27 | 8.67 | 1.67 | 57.3 |
|  | 96 | 23.27 |  |  |
| $L_4$ | 644.09 | 23.33 | 1.804 | 46.7 |
|  | ∞ | 1.10 |  |  |
| $L_5$ | 101.28 | 5.49 | 1.6968 | 55.6 |
|  | 53.59 | 9.94 |  |  |
| $L_6$ | 124.89 | 5.49 | 1.6968 | 55.6 |
|  | 54.89 | 45.40 | 1.5927 | 35.5 |
|  | −3,053.09 | 13.17 |  |  |
| $L_7$ | 461.49 | 32.94 | 1.64 | 60.3 |
|  | −70.54 | 5.49 | 1.51454 | 54.7 |
|  | −114.95 | 4.39 |  |  |
| $L_8$ | −250.43 | 5.49 | 1.80518 | 25.4 |
|  | 194.39 | 5.49 |  |  |

−Continued

| Lens | Radii $r_1$ to $r_{22}$ | Thicknesses and air spaces $d_1$ to $d_{21}$ | $f=100, 2\omega=100°$ $n_1$ to $n_{12}$ | $\nu_1$ to $\mu_{12}$ |
|---|---|---|---|---|
| $L_9$ | −1,754.41<br>−100.06 | 13.72<br>0.82 | 1.618 | 63.4 |
| $L_{10}$ | −367.23<br>−133.99 | 12.35 | 1.618 | 63.4 |

$$\frac{f_{123}}{f_{45}} = 0.573.$$

5. A small retrofocus type super wide-angle objective lens system as claimed in claim 1, wherein $f=100$ mm and $2\omega=100°$ and $r_1$ and $r_{22}$, $d_1$ to $d_{21}$, $n_1$ to $n_{12}$ and $\nu_1$ to $\nu_{12}$ are given by the following values:

| Lens | Radii $r_1$ to $r_{22}$ | Thicknesses and air spaces $d_1$ to $d_{21}$ | $f=100, 2\omega=100°$ $n_1$ to $n_{12}$ | $\nu_1$ to $\nu_{12}$ |
|---|---|---|---|---|
| $L_1$ | 495.86<br>1,096.11 | 26.90<br>1.09 | 1.8061 | 40.8 |
| $L_2$ | 156.51<br>74.22 | 8.73<br>26.74 | 1.67 | 57.33 |
| $L_3$ | 258.96<br>101.01 | 8.62<br>23.14 | 1.67 | 57.33 |

−Continued

| Lens | Radii $r_1$ to $r_{22}$ | Thicknesses and air spaces $d_1$ to $d_{21}$ | $f=100, 2\omega=100°$ $n_1$ to $n_{12}$ | $\nu_1$ to $\nu_{12}$ |
|---|---|---|---|---|
| $L_4$ | 426.22<br>−574.85<br>−8,345.24 | 12.28<br>10.91<br>1.09 | 1.7552<br>1.834 | 27.51<br>37.19 |
| $L_5$ | 103.21<br>54.38 | 5.46<br>9.88 | 1.6968 | 55.62 |
| $L_6$ | 160.76<br>−585.01 | 50.59<br>13.10 | 1.56732 | 42.83 |
| $L_7$ | 648.73<br>−99.14 | 34.60<br>4.42 | 1.6398 | 34.58 |
| $L_8$ | −137.99<br>−109.12<br>252.34 | 5.46<br>3.55<br>5.73 | 1.804<br>1.8052 | 46.65<br>25.43 |
| $L_9$ | −417.21<br>−94.77 | 13.10<br>6.82 | 1.618 | 63.38 |
| $L_{10}$ | −968.20<br>−119.64 | 16.10 | 1.618 | 63.38 |

$$\frac{f_{123}}{f_{45}} = 0.497.$$

* * * * *